United States Patent [19]

DeMenthon

[11] Patent Number: 5,227,985
[45] Date of Patent: Jul. 13, 1993

[54] COMPUTER VISION SYSTEM FOR POSITION MONITORING IN THREE DIMENSIONS USING NON-COPLANAR LIGHT SOURCES ATTACHED TO A MONITORED OBJECT

[75] Inventor: Daniel F. DeMenthon, Columbia, Md.

[73] Assignee: University of Maryland, College Park, Md.

[21] Appl. No.: 747,124

[22] Filed: Aug. 19, 1991

[51] Int. Cl.$^5$ .................. G06F 15/20; G01B 11/00
[52] U.S. Cl. ........................... 364/559; 364/516; 340/706
[58] Field of Search ........... 364/559, 516, 410, 413.01, 364/413.13; 340/706; 358/105, 107; 395/127, 152

[56] References Cited

U.S. PATENT DOCUMENTS

| | | | |
|---|---|---|---|
| 4,565,999 | 1/1986 | King et al. | 340/706 |
| 4,631,676 | 12/1986 | Pugh | 364/413 |
| 4,649,504 | 3/1987 | Friedman et al. | 364/559 |
| 4,672,562 | 6/1987 | Egli et al. | 364/559 |
| 4,719,584 | 1/1988 | Rue et al. | 364/516 |
| 4,796,187 | 1/1989 | North | 364/423 |
| 4,891,630 | 1/1990 | Krouglicof et al. | 340/706 |
| 4,956,794 | 9/1990 | Zeevi et al. | 364/559 |
| 4,984,179 | 1/1991 | Waldern | 364/514 |
| 4,988,981 | 1/1991 | Zimmerman et al. | 340/709 |

OTHER PUBLICATIONS

"New Exact Appro. Solutions of the Three-Point Perspective Problem", DeMenthon & Davis, Jan. 1990 Int. Conf. Robotics & Auto., Cincinnati, pp. 40-45.

"An Analytical Solution for the Perspective-4-Point Problem", 1989, Horaud, Conio & Leboulleux, Comp. vision, Graphics, & Image Proc. vol. 47, pp. 33-44.

"Recognition by Linear Combinations of Models", Ullman & Basri, A. I. Memo #1152, Aug. 1989, MIT AI Laboratory, pp. 1-42.

"Shape & Motion from Image Streams: A Factorization Method 2. Point Features in 3D Motion", Tomasi & Kanade, TR CMU-CS-91-105, CMU, Jan. 1991, pp. 1-40.

Primary Examiner—Jack B. Harvey
Assistant Examiner—Brian M. Buroker
Attorney, Agent, or Firm—Christopher N. Sears

[57] ABSTRACT

A sensing system for monitoring the position and orientation of a rigid object (20). At least 4 point light sources (24) are mounted on the surface of the object (20) in a noncoplanar arrangement. A single electronic camera (26) captures images (59) of the point light sources (24). Locations of the images (59) of the light sources (24) are detected in each video image, and a computer runs a task using these locations to obtain close approximations of the rotation matrix and translation vector (33) of the object (20) in a camera coordinate system (74) at video rate. The object is held by an operator (90) for three-dimensional cursor (94) control and interaction with virtual reality scenes (96) on computer displays (88), and for remote interactive control of teleoperated mechanisms.

15 Claims, 14 Drawing Sheets

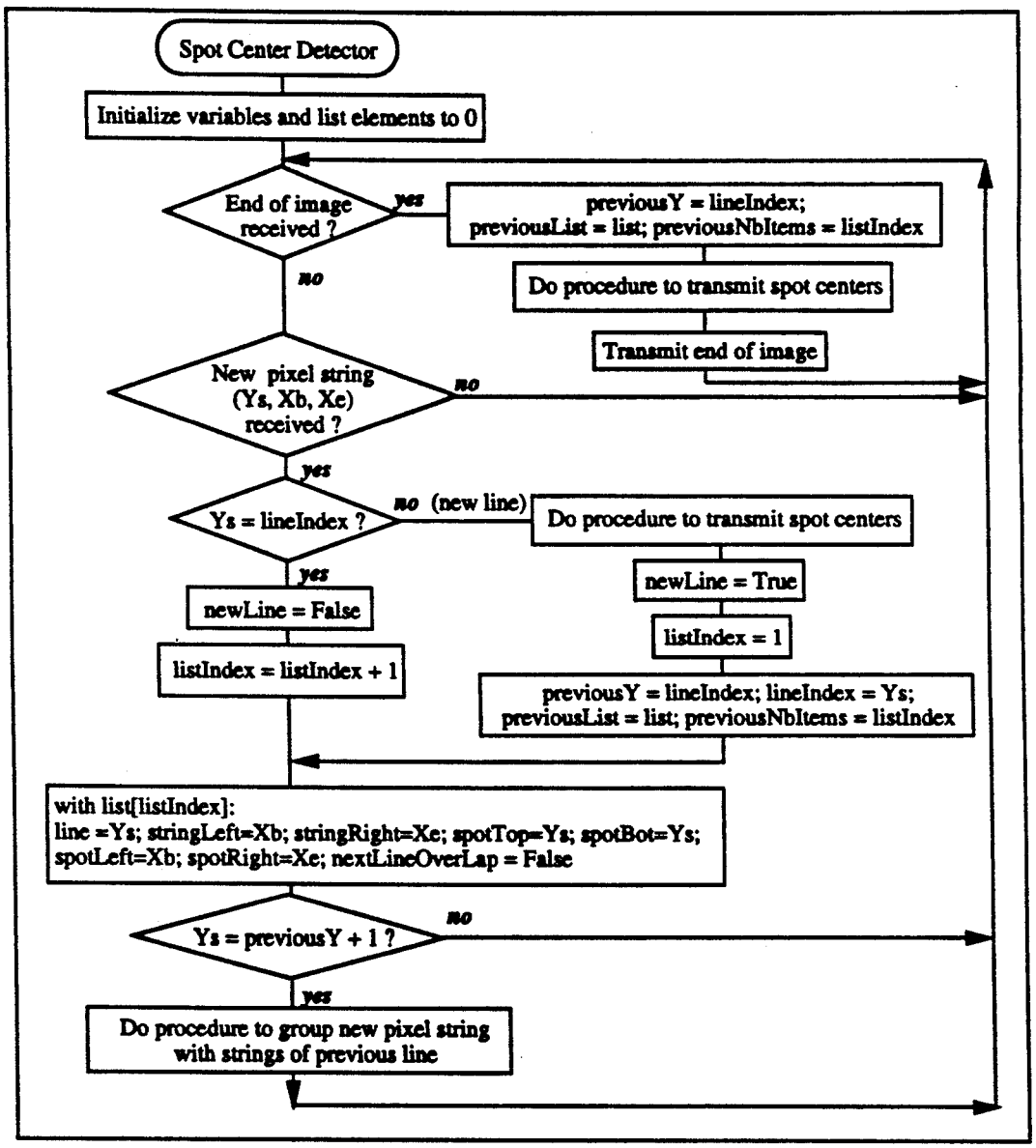
*Fig. 4-A*

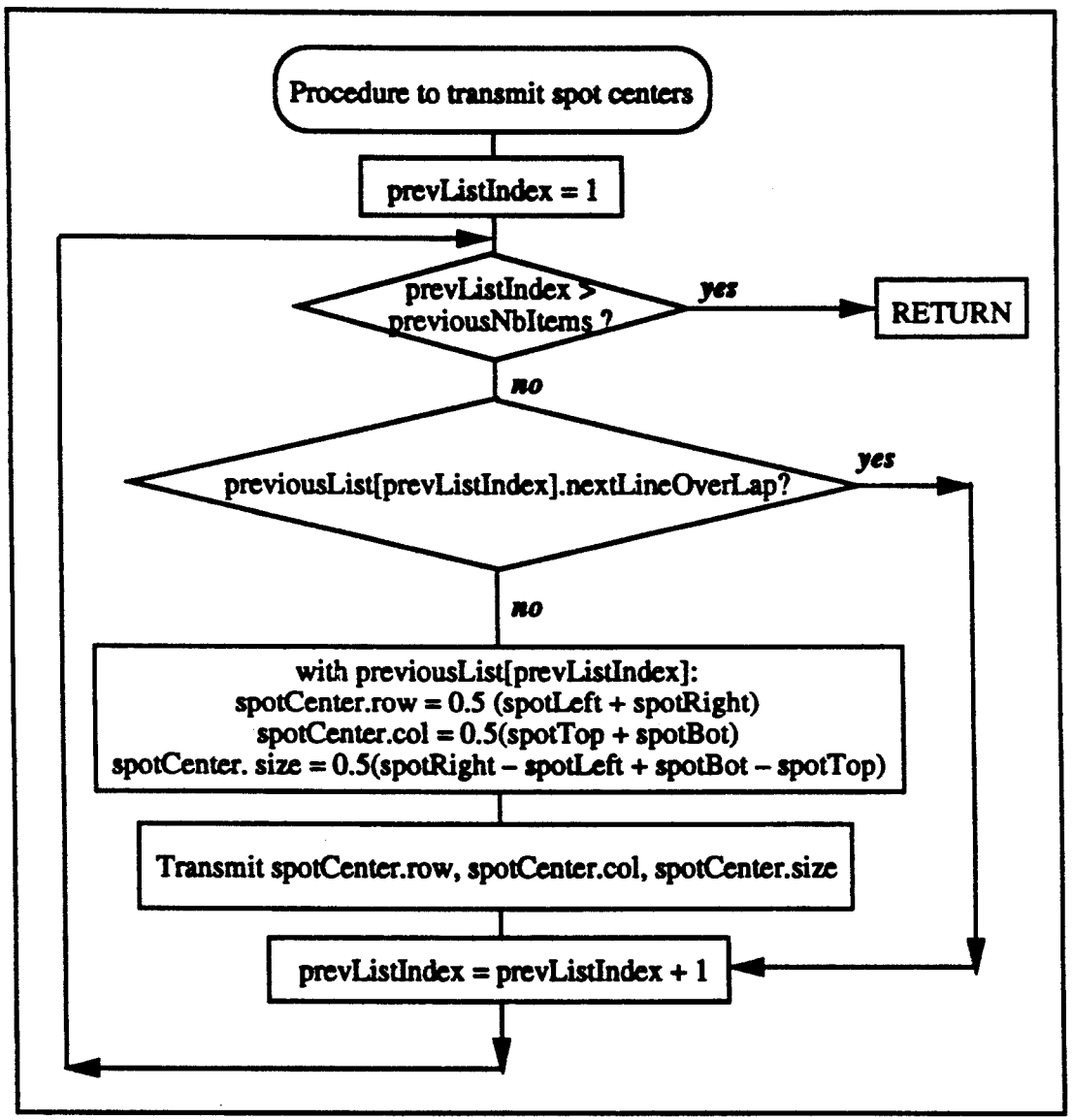
*Fig. 4-B*

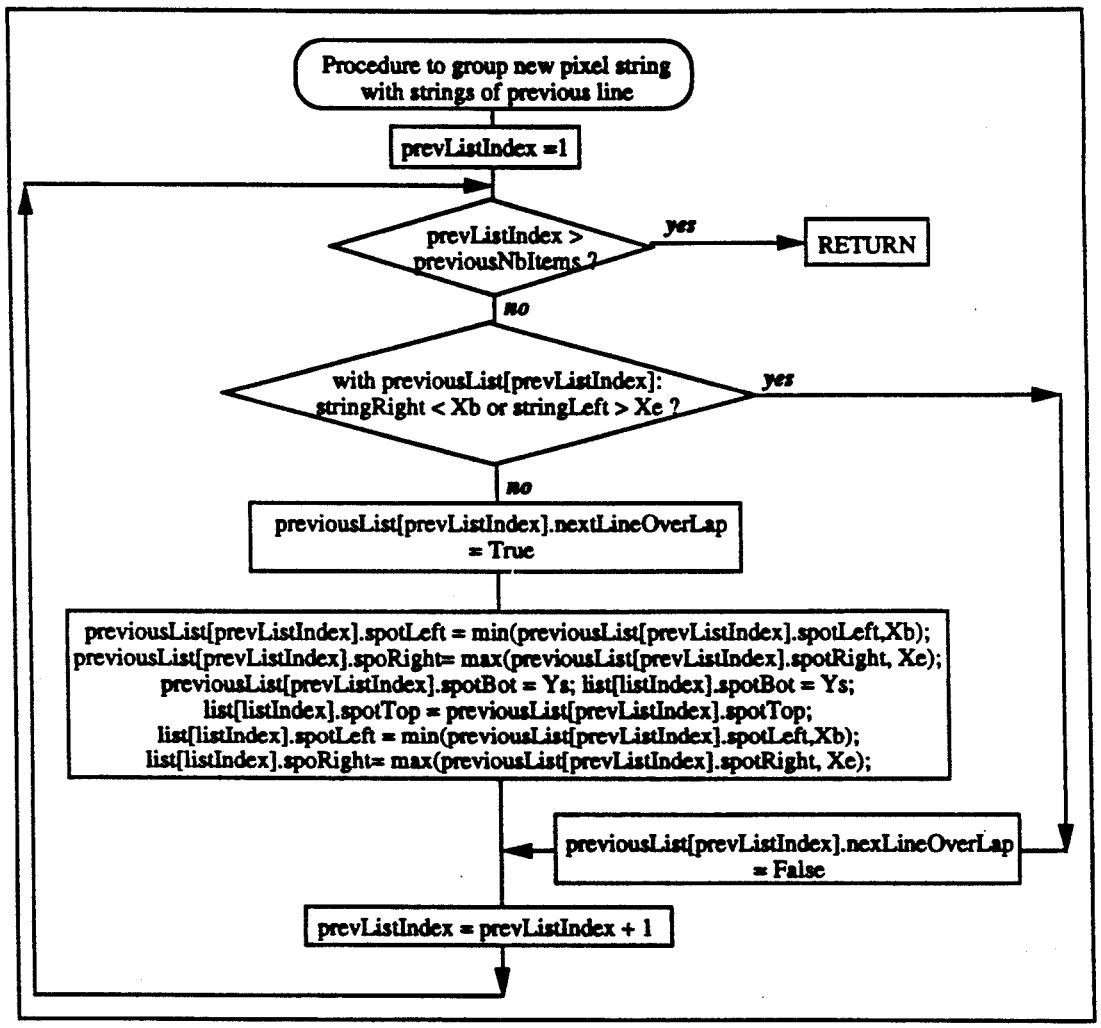
*Fig. 4-C*

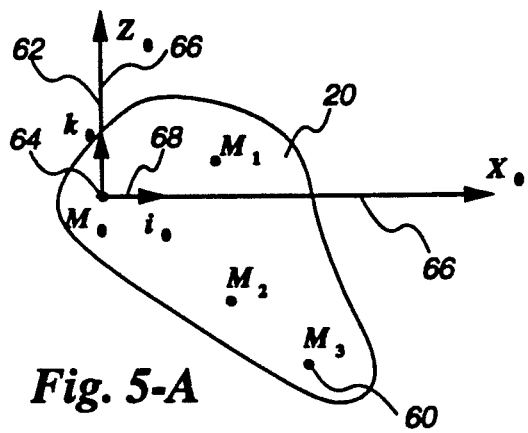
Fig. 5-A
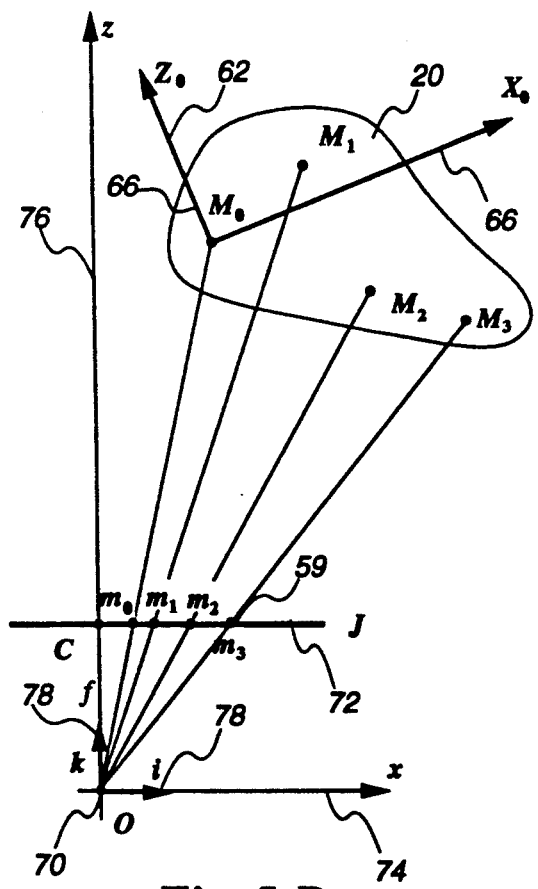
Fig. 5-B
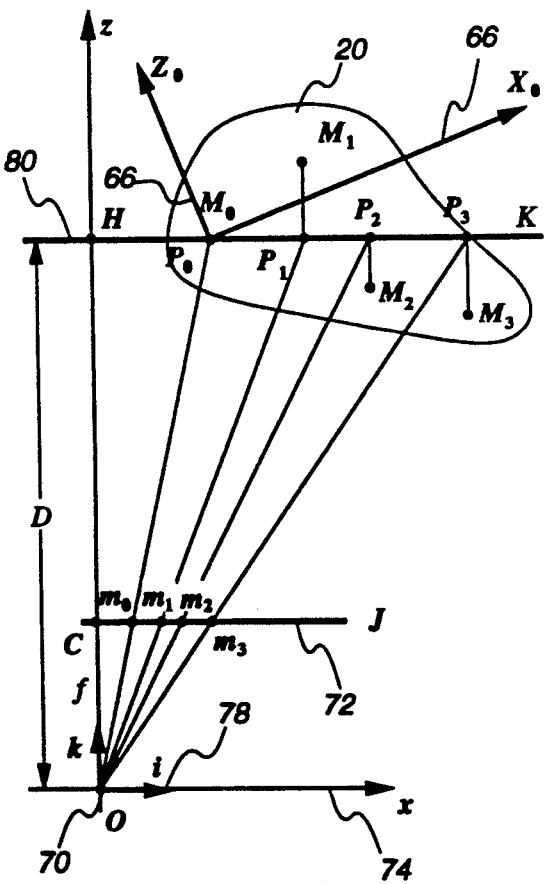
Fig. 5-C

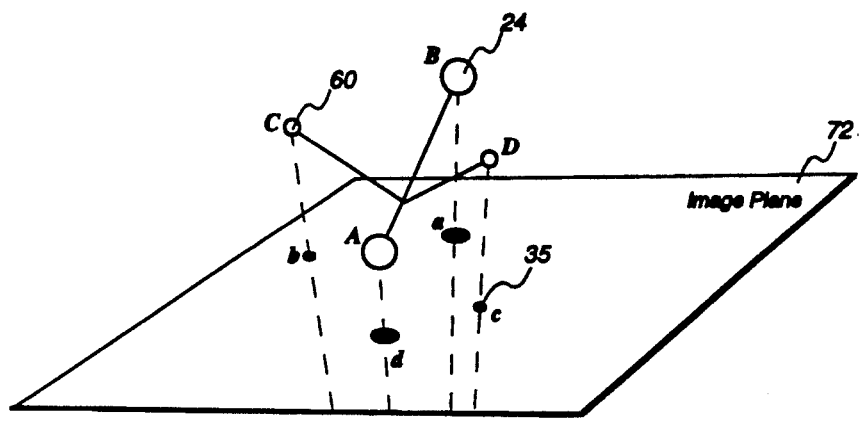
*Fig. 6-A*
- Large spots are matched to large diodes:
Possible correspondences:
| B -> a | B -> d | B -> a | B -> d |
| A -> d | A -> a | A -> d | A -> a |
| C -> b | C -> b | C -> c | C -> c |
| D -> c | D -> c | D -> b | D -> b |
or / or / or
- Only first combination yields small correspondence measure
*Fig. 6-B*
Center of Projection

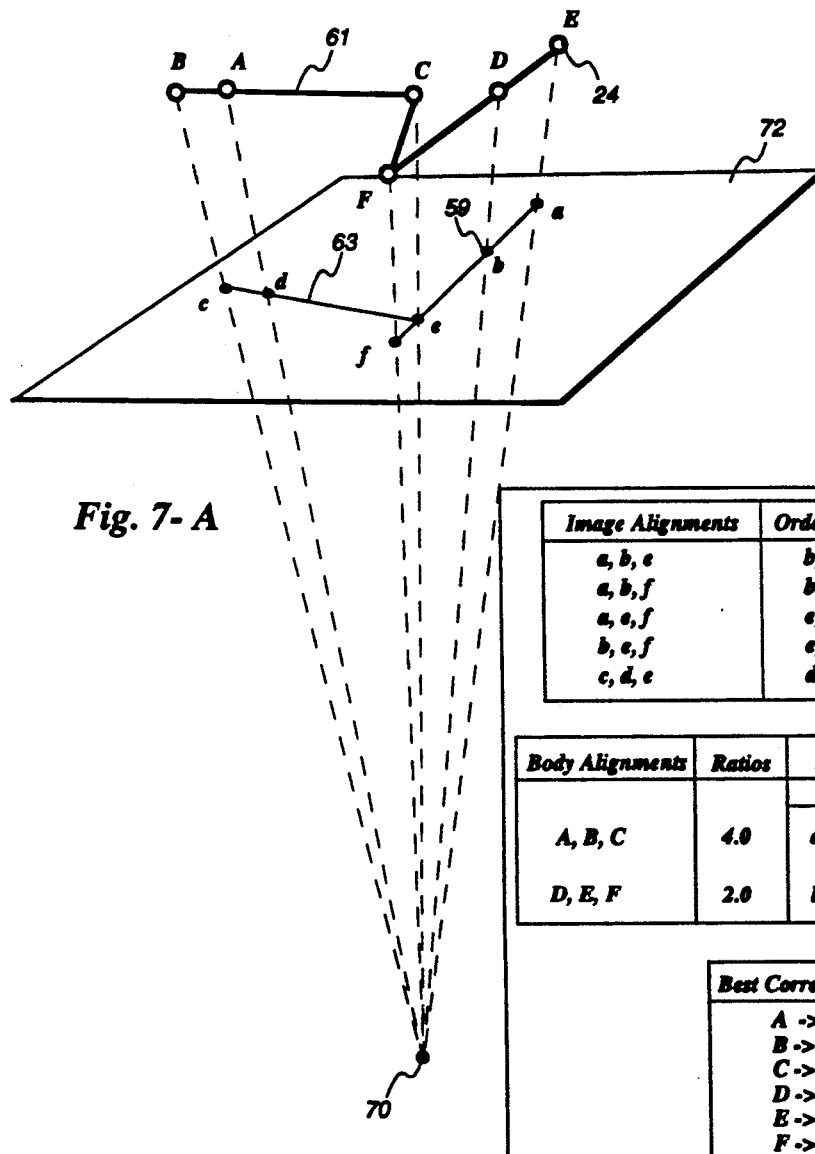
*Fig. 7-A*
*Fig. 7-B*

Loop for each triple of image spot centers from list
  Find average distance between each point and line joining other 2 points
  If average distance is under a given threshold distance
    The 3 points are assumed aligned
    Order the 3 points:
      In-between point first
      Closest end point second
      Farthest end point third
    Compute length of line segment between first and third point
    Compute length of line segment between first and second point
    Compute ratio of these 2 lengths (image alignement ratio)
    For each known object alignement ratio
      Compare this object ratio with found image alignement ratio
      If absolute difference between 2 ratios is within given threshold
        Put found aligned image triple in bin of object alignement ratio,
        sorting it among the other triples already stored there,
        using absolute difference
    End For
  End If under threshold
End Loop for each triple

Consider the combination of image triples stored on top of the lists of the object ratio bins.
If no point is used in two triples
  Match the ordered points of each image triple with the ordered points
  of the object triple corresponding to the ratio of its bin
  Compute correspondence measure
  If correspondence measure is small
    Output object pose and EXIT
End if

Else if any image point used in 2 triples or if corresp. measure large
  Consider all other combinations between triples of each list
  Reject those with duplicated points
  Rank the remaining ones based on the sum of the ratio differences of each of its triple
  For all combinations from high rank to low rank
    Match the ordered points of each image triple with the ordered points
    of the object triple corresponding to the ratio of its bin
    Compute correspondence measure
    If correspondence measure is small
      Output object pose and EXIT
  End For
End if

If no correspondence measure is small, start over with another image.

*Fig. 8*

COMPUTER VISION SYSTEM FOR POSITION MONITORING IN THREE DIMENSIONS USING NON-COPLANAR LIGHT SOURCES ATTACHED TO A MONITORED OBJECT

The U.S. Government has rights to this invention pursuant to Grant DARPA 01528539 from the U.S. Defense Advanced Research Project Agency.

FIELD OF THE INVENTION

This invention relates to a computer vision system for monitoring the position and orientation of an object in space. This invention also relates to a computer vision system for monitoring the position and orientation of an object while it is displaced by an operator, who is enabled to interactively control various devices such as teleoperated mechanisms or graphics displays presented to his eyes while his motions are sensed and computed.

BACKGROUND OF THE INVENTION

The field of computer vision includes the computer analysis of scenes projected into an electronic camera. The camera generates images of the scenes, and the computer analyzes these images and draws useful conclusions.

In particular, an active branch of computer vision is devoted to computing the position and orientation in space of an object, also called object pose, by detecting several features of the object in a single image from a single camera or in two images from two cameras.

Implementations using two cameras apply well-known stereometric techniques, in which the position of each feature in 3 D can be obtained by triangulation from the positions of the projection of this feature in each of the two images. For more details on stereometric techniques, see the book titled "Robot Vision", by Berthold K. P. Horn, MIT Press. This type of technique has several drawbacks. First, this system requires two cameras, which increases system cost. Second, calibrating the relative positions of the two cameras is difficult, and the system output is very sensitive to calibration errors. Third, generating the rotation matrix for an object requires lengthy trigonometric computations, and combining data from more than 3 object points requires matrix inversion computations. This results in increased hardware cost in situations where real time system response is needed.

In stereometric techniques the position of each object feature in space is found individually, without making use of additional information, such as the relative positions is available, other techniques are preferable, because they can recover the position and orientation of the object from a single image. For example, if 3 points of an object are detected in a single image and the distance between theses features in the object is known, it is possible to recover the pose of the object. However, a polynomial equation must be solved, and 2 or 4 solutions for the object pose are found. See for example "New Exact and Approximate Solutions of the Three-Point Perspective Problem", by Daniel DeMenthon and Larry Davis, 1990 International Conference on Robotics and Automation, Cincinatti, pp. 40–45. If more than 3 points are used, the solution becomes unique, but the formulas become more complicated, and would be practical only with costly hardware in real time use. See for example "An Analytical Solution for the Perspective-4-Point Problem", by Radu Horaud, Bernard Conio and Olivier Leboulleux, Computer Vision, Graphics, and Image Processing, vol. 47, pp. 33–44, 1989. One would like to choose 5 points or more to increase the reliability of the object pose results, but is faced with highly difficult mathematical computations.

An alternative approach that uses much simpler computations assumes well-known approximations to perspective projection, called orthographic projection and scaled orthographic projection. Scaled orthographic projection is an improved version of orthographic projection in which changes of scales due to the distance between the object and the camera are accounted for. Such an approach is taken for example by Ullman and Basri in "Recognition by Linear Combinations of Models", A.I. Memo no. 1152, August 1989, Massachusetts Institute of Technology Artificial Intelligence Laboratory. These authors find 3 precomputed projections of the points of the object by orthographic projection in 3 known spatial orientations. Then they approximate a new image of the points of the object as a scaled orthographic projection. They show that any new projected image can be expressed as a linear combination of the 3 precomputed projections. The coefficients of the linear combination are recovered using the image and a precomputed matrix based on the 3 precomputed projections. Then these coefficients can be used for combining the 3 rotation matrices used in the 3 precomputed poses to obtain the rotation matrix of the object. The translation of the object can also be recovered easily by computing a scaling factor. Finding the rotation and translation of an object is not explicitely taught by the authors, because their final goal is the recognition of an object from images instead of its pose, but can be easily deduced from the explanations of the authors. An advantage of this method is that the rotation matrix is obtained directly without any trigonometric operation on angles such as Euler angles. However, the computation requires combining several images of the object, which is a more complex and less reliable procedure when compared with the inventive features disclosed below.

In an approach related to that of Ullman and Basri, Carlo Tomasi and Takeo Kanade use orthographic projection to write a system of equations from a sequence of images. This approach is presented in "Shape and Motion from Image Streams: A Factorization Method. 2. Point Features in 3 D Motion", Technical Report CMU-CS-91-105, Carnegie Mellon University, January 1991. By this method, the structure of the object can be recovered as well as the rotation matrix of the object for each of the images of the sequence. Disadvantages of this system include (1) inversions of large matrices that have to be performed at run time and (2) not recovering the translation of the object.

In contrast, according to this invention, the orientation and translation of the object can be obtained in a very direct and fast way from a single image of the object by:

(a) Multiplying a precomputed matrix depending only on the relative positions of the points of the object by two vectors depending only on the positions of the projections of the feature in the image;

(b) Normalizing the two resulting vectors to obtain their norms and the first two rows of the rotation matrix;

(c) Taking the cross-product of these two vectors to obtain the third row;

(d) Multiplying a known vector by one of the norms to obtain the translation vector;

The rotation matrix and the translation vector are a very good approximation to the actual rotation matrix and translation vector, provided the distances between the points of the object being used are small compared to their distances to the camera. Also, many points can be used for the object for improved reliability without any changes in the steps above.

One embodiment of this invention is a system for measuring the motions of an operator, for example measuring the displacement of his head or his hand. A virtual scene of virtual objects is modified according to these measurements. With this system the operator can interact with a virtual scene displayed in front of his eyes by using the motions of his head or his hand. The operator may want to observe a part of the virtual scene out of his present field of view; the system detects the rotation of his head and generates the part of the virtual scene corresponding to the new field of view. Also, in another embodiment the operator may hold a specially designed object in his hand. The system displays the motions of this object and displays a corresponding virtual object in the virtual scene. This virtual object may be used as a pointing cursor and more generally as a tool to interact with the other virtual objects of the scenery.

An early implementation of such concepts using a mechanical mouse was popularized by the Macintosh computer; the operator's displacements in two dimensions are sensed by the mouse and are translated into the motion of a cursor in a two-dimensional (2D) virtual world of documents, files, folders. Interaction of the 2D cursor with the objects of this 2D world allows the operator to drag files into folders, scroll pages, drop documents into a trash can, etc.

However, in more and more applications, a virtual world of three-dimensional (3D) objects is represented on a display, or a pair of displays providing stereo vision, and the operator must be able to translate and rotate these objects. Some attempts have been made to decompose 3D motions into a sequence of 2D motions, so that a 2D input device could be used to manipulate 3D objects. However, producing 3D motions of objects with this decomposition method is time consuming, non intuitive and frustrating. Furthermore if the operator decides to bring back an object to its original position, he must remember the sequence of motions and follow it in exact reverse order.

To solve these problems, several devices which sense 3D motions of the operator have been proposed. Transducers measure these displacements and transmit them to the computer. For example, U.S. Pat. No. 4,988,981 to Zimmerman and Lanier, 1991, entitled "Computer Data Entry and Manipulation Apparatus and Method", describes a glove worn by the operator, on which translation and orientation sensors are attached. Translation is detected by use of an ultrasonic transmitter attached to the glove and three ultrasonic receivers positioned around the display. Orientation is detected by a low frequency magnetic field transmitter attached to the glove and a field detection system next to the display. The measured translation and rotation parameters are used to position a hand-shaped cursor on the display screen of the host computer according to the position and orientation of the operator's hand in space. Flex sensors are also provided for measuring the degree of flex of fingers. Fingers may be represented with similar flex on the hand-shaped cursor, and may allow refined communication methods with the virtual world.

Instead of being mounted on a glove, orientation and translation sensors may be enclosed in a box or a pen that the operator holds in his hand and displaces in space. One such system, called the Bird is made by Exos, Inc., Burlington. Mass. Other systems were described by Paul McAvinney in "Telltale Gestures—3-D applications need 3-D input", Byte, July 1990, pp. 237-240. These systems apply triangulation techniques as well, between several transmitters, either ultrasonic or magnetic, and several receivers. They require relatively complex hardware and are relatively expensive.

Optical techniques have been applied instead of magnetic and ultrasonic techniques for operator interaction with computer generated display. An example of a computer vision system is set forth in U.S. Pat. No. 4,649,504 to Krouglicof, 1987, entitled "Optical Position and Orientation Techniques". This patent disclosures a system for monitoring the position and orientation of a pilot's helmet, in which the features that are detected optically are light emitting diodes (LEDs). The LEDs are turned on and off in succession, and the each illuminated LED is detected by two light sensors equipped with camera lenses. Triangulation provides the corresponding 3D position of each considered LED. With 3 or more LEDs, the corresponding position and orientation of the helmet in space can be uniquely determined. The method described in this patent is essentially a stereometric technique, with all the related drawbacks discussed above.

In U.S. Pat. No. 4,891,630 to Friedman, 1990, entitled "Computer Vision System with Improved Object Orientation Technique", a system is described using a single camera for monitoring the head motion of an operator for eyetracking purposes. A camera takes images of a patch which is attached to the cheek of the operator. The patch has 4 small flat reflective elements at its corners and a large hemispheric reflective element at its center. Reflections of a light source on these elements are detected in images taken by the camera. Reflections from the small flat elements are point-like reflections from locations which are fixed with respect to the patch, whereas reflections from the surface of the large hemispheric element may come from various locations on this surface, depending on the orientation of the patch. Therefore, when the operator moves his head, these reflections move differently in the image whether they come from the flat elements or from the hemispherical element, and formulas for head angles changes using these reflection differences are provided. However these formulations can provide only qualitative angle changes, and are valid only for very small angle changes. They are sufficient for the specific application described in the patent, but would provide incorrect results if they were applied to tracking the large displacements of an object held in the hand of an operator. In contrast the apparatus in the present disclosure gives valid results for large displacements of an object.

An example of display cursor control by optical techniques is presented in U.S. Pat. No. 4,565,999 to King et al., 1986, entitled "Light Pencil". A device fixed to the head of the operator comprises 4 LEDs. A photodetector placed above the computer display senses the variations of intensity of the LEDs and a processor relates these variations to changes in orientation of the LEDs with respect to the photodetector. However, this system is intended for the control of horizontal displacement of a cursor on the display by the operator's vertical and horizontal rotations. It does not provide a way to detect other motions such as translations or roll, and therefore cannot be applied to general 3D object pose monitoring

SUMMARY OF THE INVENTION

The object of this invention is to provide a computer vision system for monitoring the spatial pose of an object with a single camera. In the preferred embodiment, at least four point light sources such as light emitting diodes are mounted in a noncoplanar fashion on the object.

In a preliminary step, the positions of each light source with respect to a coordinate system of the object are measured in a coordinate system for the object. The origin of this coordinate system is preferably taken to be one of the point light sources. A matrix is created in which each row has 3 elements that are the 3 coordinates X, Y, Z of each of the light sources other than the origin light source. The pseudo-inverse matrix of this matrix is computed, and is called the object matrix in this disclosure. This object matrix is computed only once for a given configuration of light sources on the object.

In the monitoring phase, a camera equipped with a light sensitive array such as a CCD array captures images of the light sources. The light sources project as spots on this light sensitive array. The positions and sizes of these spots are found in the camera images. The relative sizes and/or positions of the light sources on the object are chosen so that the correspondences between the image spots and the point light sources are easily found.

The coordinates $x_0$ and $y_0$ of the image $m_0$ of the origin of the object coordinate system are found by this process, as well as the $x$ and $y$ coordinates of the image spots of the other light sources. A vector of the values $x - x_0$ is created by substracting the coordinate $x_0$ of the origin spot from the x-coordinates of the other image spots. This vector is called the image x-vector in this disclosure. Multiplying the image x-vector with the object matrix defined above yields a vector with 3 coordinates, called $V_x$ in this disclosure (Bold characters are used for vectors). Normalizing this vector yields the first row of this rotation matrix. The norm of this vector $V_x$ is a scale factor called $s_1$ used for computing the translation of the object. Similarly, an image y-vector of the values $y - y_0$ is created by subtracting the coordinate $y_0$ of the origin image spot from the y-coordinate of the other image spots. Multiplying the image y-vector with the object matrix yields a vector with 3 coordinates called $V_y$ in this disclosure. Normalizing this vector yields the second row of this rotation matrix. The norm of this vector is a scale factor called $s_2$. The third row of the rotation matrix is the cross product between the first two rows.

The translation vector of the object coordinate system in the camera coordinate system is defined as the vector defined by the center of projection and the origin $M_0$ of the object coordinate system. It is a vector proportional to the vector defined by the center of projection of the camera and the image point $m_0$ of the object coordinate system origin, and the coefficient of proportionality is the inverse of the scale factor $s_1$ or the scale factor $s_2$. These two scale factors $s_1$ and $s_2$ are found equal within processing errors, and the first two rows of the rotation matrix are found orthogonal as expected, provided the proper correspondence between object light sources and image spots has been used.

To find this proper correspondence, the system individually recognizes each of the light sources in the images. The light sources are grouped in specific alignments on the object, and these alignments are recognized in the images. The system can also use other differentiating characteristics of the light sources such as differences in size, color, pulsation rates. If ambiguities remain and result in several possible object poses, the system chooses the correspondence assignment and the pose which gives equal scale factors $s_1$ and $s_2$ and orthogonal row vectors in the rotation matrix. Equivalently, the system chooses the pose for which vectors $V_x$ and $V_y$ are equal in length and perpendicular.

In a cursor control embodiment of this invention, the object is held by the operator, and the positions and orientations in space of this object are computed with high frequency. A virtual cursor of known 3D structure is considered to be rigidly linked to the object and therefore move along with the object. In other words the translation vector and rotation matrix of the virtual 3D cursor is taken to be equal to those computed by the system for the object. Then the perspective view of the 3D cursor on the computer displays is obtained by the same perspective projection that is used for the other 3D objects of the virtual 3D scene represented on the displays.

In a teleoperation embodiment, servomechanisms translate the computed motions of the operator into the motion of the teleoperated system.

The system according to this invention is fast enough so that the position and orientation of the object can be obtained every time the camera transmits a new image through it video signal, typically every 1/25 to 1/30 second for most cameras, using only inexpensive hardware.

OBJECTS AND ADVANTAGES OF THE INVENTION

Accordingly, several objects and advantages of the present invention are:

(a) To provide a system in which a single electronic camera can be used for monitoring large motions of a moving object;

(b) To provide a system for computing the rotation matrix and translation vector of an object in space using images of points of the object obtained by an electronic camera, in few computational steps involving mainly the multiplication of precomputed matrix by two vectors and the normalization of the results;

(c) To provide a system in which light sources are affixed at several noncoplanar locations on an object in specific alignments and distance ratios in order to facilitate the detection and the labelling of the object points in the images of the electronic camera;

(d) To provide a system in which the pose of an object can be monitored with high frequency using low cost hardware and simple computer tasks;

(e) To provide a system in which more points can be detected for added reliability of the computation without changes in the basic steps of the computer tasks;

(f) To provide a system in which large translation and rotation motions of an operator are monitored by a single camera with sufficient accuracy to let the operator remotely and interactively modify views of a virtual scene or positions, or interact with virtual objects displayed on this scene, and remotely control teleoperated devices.

Still further advantages will become apparent from a consideration of the ensuing description and drawings.

BRIEF DESCRIPTION OF THE DRAWINGS

FIG. 4A, FIG. 4B and FIG. 4C shows flowcharts for a task which outputs the centers and sizes of bright spots of adjacent bright pixels using the positions of their edge pixels.

The drawings in FIG. 5 represent an object containing 4 optically detectable points (FIG. 5A), and show the relationship between these points and their images according to true perspective (FIG. 5B) and according to an approximation of true perspective called scaled orthographic projection (FIG. 5C).

FIG. 6 illustrates a task implementation for assigning the correspondence between image spots and object point light sources when only 4 light sources are used, two of which produce much larger image spots than the other two.

FIG. 7 illustrates the task of finding the correspondence between image spots and light sources of the object when the point light sources have been arranged in two alignments of 3 points with specific ratios in each alignments.

FIG. 8 shows a block diagram for the sequence of operations required for finding the correspondence between image spots and object point light sources when the light sources have been arranged in several alignments of 3 points.

Figure 9:
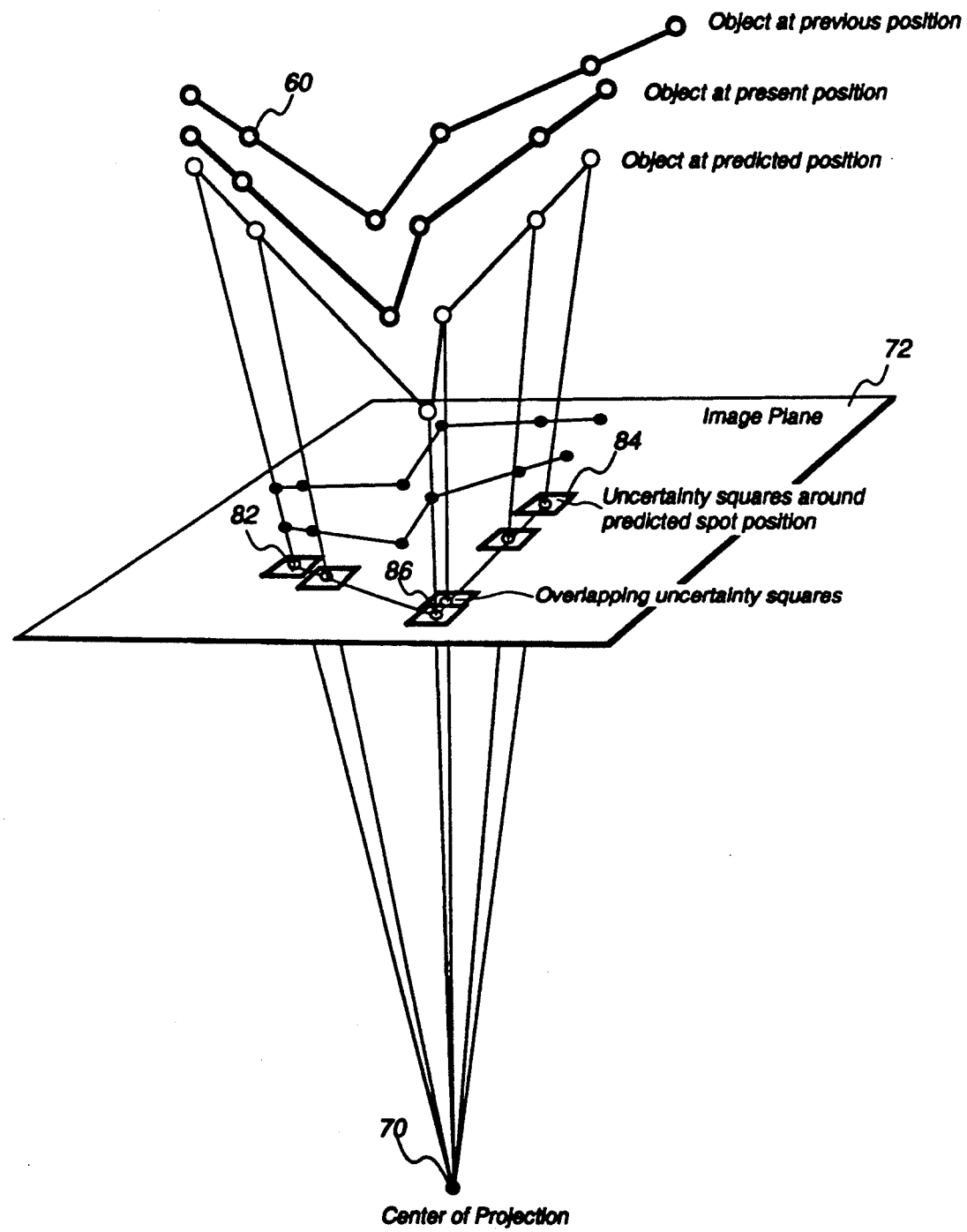

FIG. 9 illustrates the process used for finding the object pose once at least two previous poses have been found.

Figure 10:
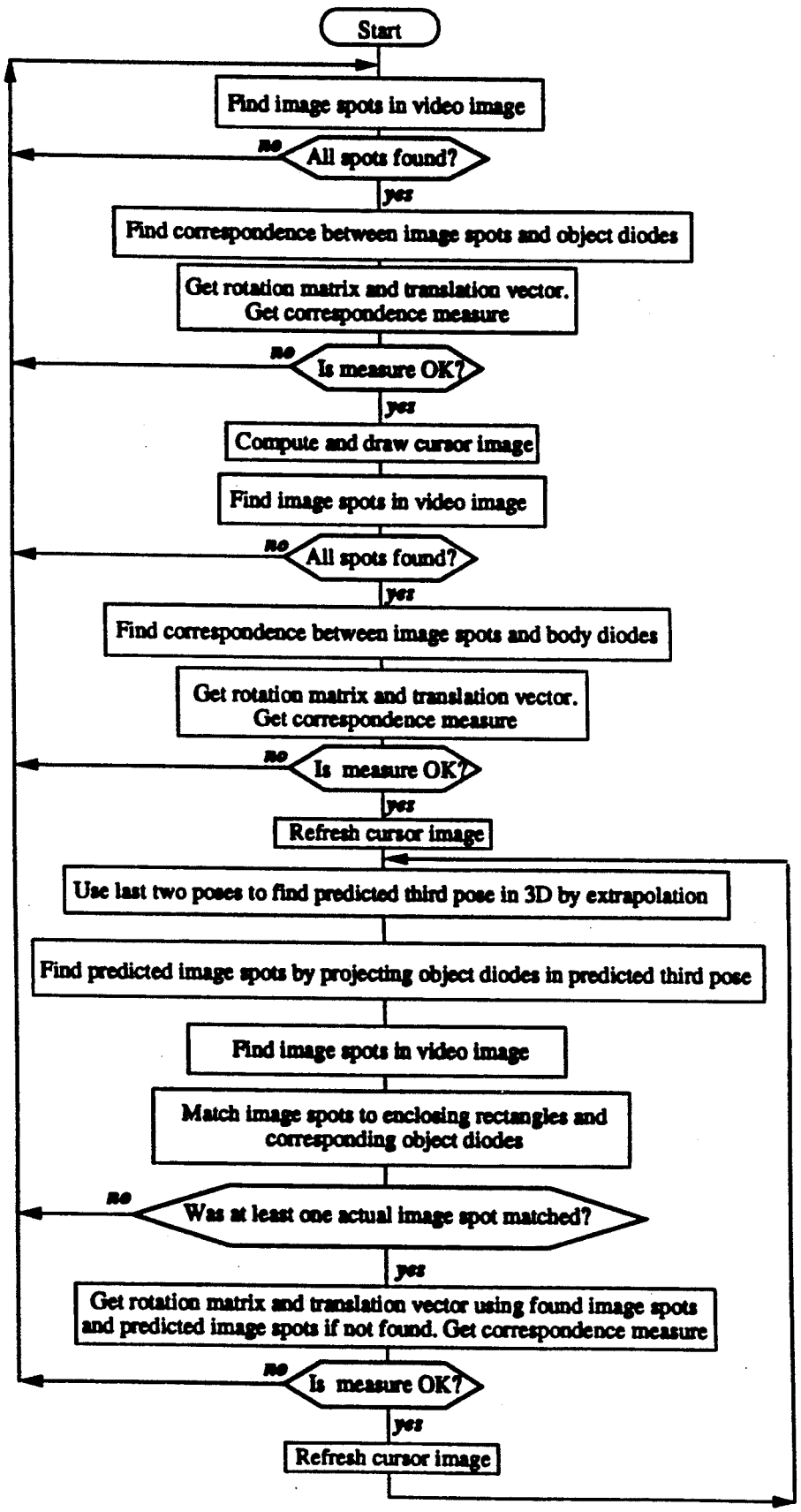

FIG. 10 is a flowchart of the sequence of operations required for continuously monitoring an object in space during extended periods of time according to this invention.

Figure 11:
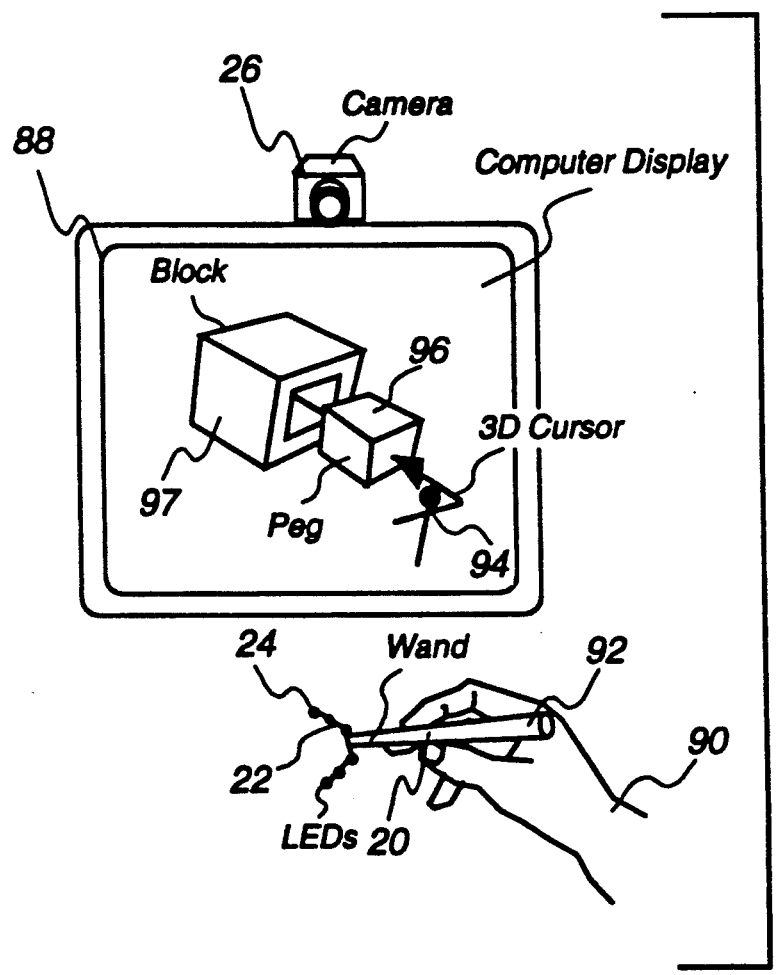

FIG. 11 is a perspective view of an embodiment for 3D cursor control allowing an operator to interact with a 3D virtual scene shown on a computer display.

Figure 12:
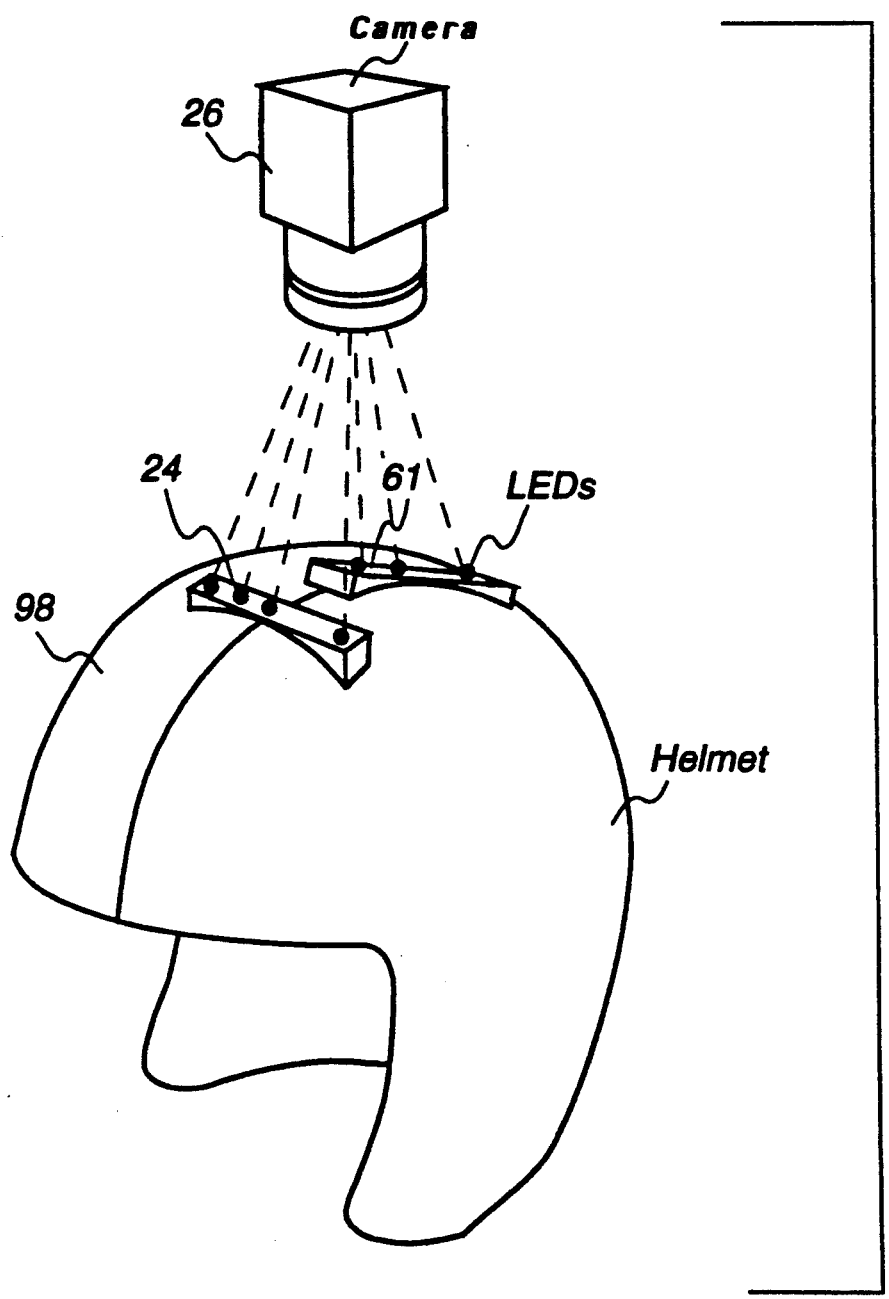

FIG. 12 is a perspective view of a pose monitoring system according to this invention applied to monitoring the position and orientation of the head of an operator.

REFERENCE NUMERALS IN THE DRAWINGS

20 Object
22 Thin frame
24 Light emitting diodes (LEDs)
26 Camera
27 Video signal
28 Pixel String Detector
29 Object Pose Module
30 Spot Center Detector
31 Precomputed matrix
32 Spot Level Detector
33 Translation and rotation
34 Sync Detector
35 Digitized bright spot
36 Grid lines
38 Bright pixels
40 Background pixels
42 Pixels at the beginning of a string
44 Pixels at the end of a string
46 Single pixels in a string
48 Single string overlapping 2 strings
50 Pixels that produce extremal values
52 Found center of the spot
59 Image points
60 Points of the object
61 Alignements of object points
62 Coordinate system fixed to the object
63 Alignements of image points
64 Origin of object coordinate system
66 Axes of object corrdinate system
68 Unit vectors, object coordinate system
70 Center of projection of camera
72 Image plane
74 Coordinate system of camera
76 Optical axis
78 Unit vectors, camera coordinate system
80 Plane K parallel to image plane
82 Predicted image spot locations
84 Uncertainty squares
86 Overlapping uncertainty squares
88 Computer display
90 Operator's hand
92 Handle
94 Perspective view of 3D cursor
96 Peg
97 Block
98 Helmet

DESCRIPTION OF THE PREFERRED EMBODIMENTS

Figure 1:
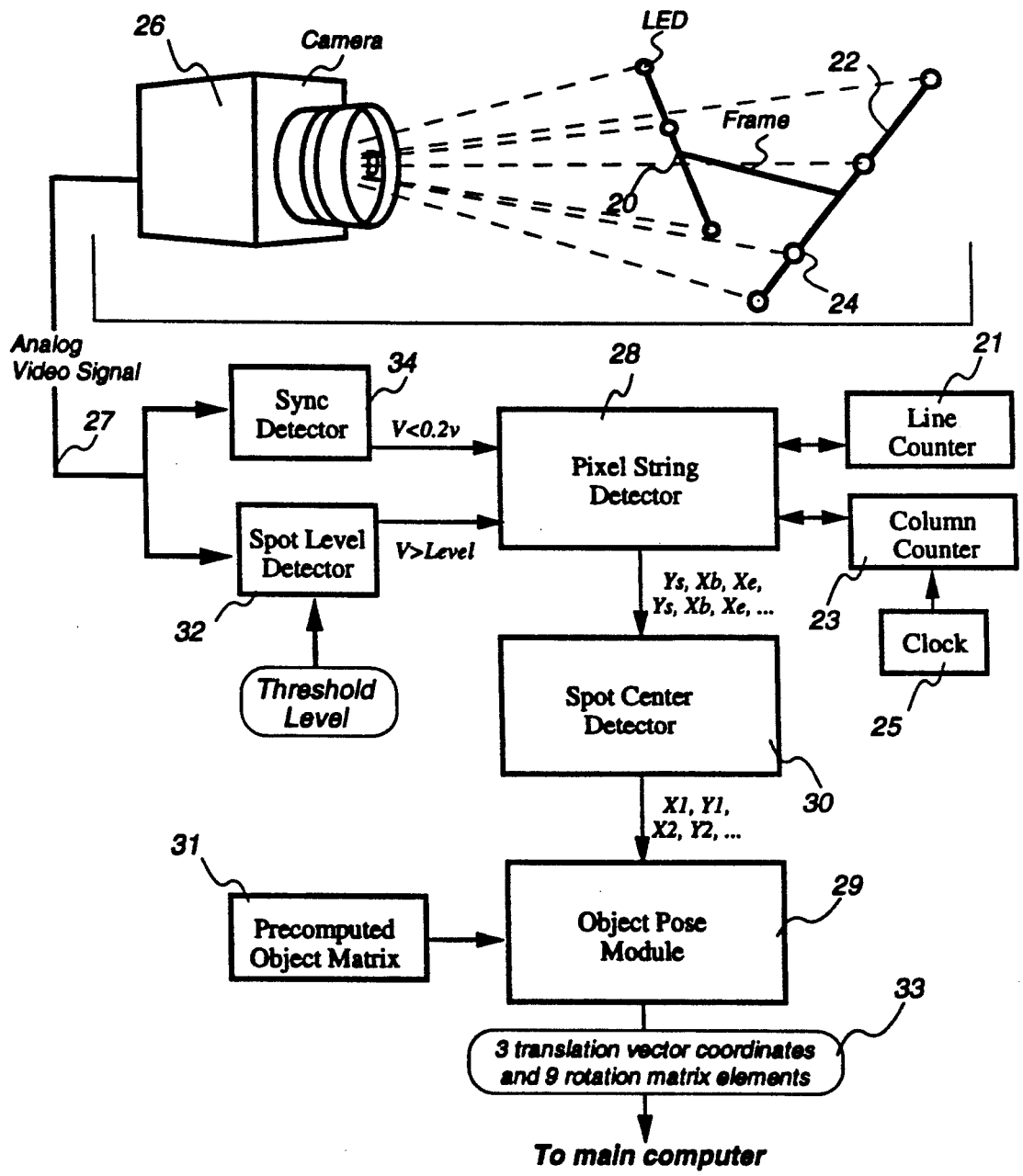
FIG. 1 is a schematic diagram of a system for monitoring the position and orientation of an object according to this invention.

FIG. 1 shows an embodiment of the present invention. Object 20 whose pose in space is being monitored is made of a thin frame 22. Light emitting diodes (LEDs) 24 of the type which produces light in all directions have been mounted on the frame. Object 20 is in the field of view of a camera 26, which contains an array of light sensitive elements such as a CCD or CID chip. Camera 26 outputs a video signal 27. Some characteristics of this signal must be understood in order to follow the principles applied in recovering image information in this embodiment. In a video signal, the video part of the signal is a modulated analog signal typically between 0.4 volt and 1 volt, which describes the intensity to be given to the electron beam of a TV monitor as the beam is scanned across the TV screen line by line and from top to bottom. A single video image, also called a video frame, is typically transmitted in the video signal in 1/25 or 1/30 second. A frame is generally composed of two interlaced fields which are to be painted on a TV screen one after the other. Pulses called sync pulses are used to indicate the beginning of a new video field and the beginning of each line. During these pulses the signal voltage falls down to a level close to 0 for an interval of several microseconds. Field pulses, indicating the beginning of a new field, are easy to differentiate from line pulses indicating the beginning of a new line, because they typically last more than 5 times longer. Details about video signals and television engineering techniques can be found in "Television Engineering Handbook", by Blair Benson, McGraw-Hill Book Co. The boxes in FIG. 1 describe the functions of the modules required by the preferred embodiment. Their global function of these modules considered as a whole is to receive the video signal, detect when a field starts and ends, and while the field of the frame is transmitted, output the rotation matrix and translation vector of the object for the instant when the image was captured, and repeat the process for each frame. This orientation and position information is therefore obtained for each frame, measuring the motion of the object in space at the rate of frame capture of the camera. To accomplish this, the positions of the centers of the bright spots created by the light sources in the frames must be detected. An obvious but costly approach consists in using a gray level or color digitizing board to obtain a pixel map of a frame and then locate the images of the object feature points in the pixel map by scanning the map. This device would be appropriate only if the detections of the feature points require the different gray levels or colors stored for each pixel in this type of board. The paper entitled "Build a Gray-Scale Video Digitizer", by Steve Ciarcia, published in two parts in Byte of May and June 1987 describes the construction of such a device. This paper teaches how to digitize different levels of gray levels in a black and white video image, and therefore describes an electronic construction which has similar functions while being more complex than the electronic construction required for the present embodiment. If the feature points are provided by light sources in a wavelength chosen to produce the highest voltage levels in the video signal, a simplified one level digitizer is sufficient, which produces pixels of level 1 for the bright spots and 0 for the background. In fact, for obtaining the centers of the bright spots only the locations of the bright pixels at the edges of the spots are required. Therefore the present embodiment preferably contains an electronic device which outputs the columns of the first and last pixels in a string of bright pixels for each row containing bright pixels. A task run in a microprocessor combines these data as they are produced to output the centers of the spots and their size. This description above summarizes the functions and interactions of the blocks in the block diagram at the bottom of FIG. 1.

Focusing now on the specific function of each block in FIG. 1, Spot Level Detector 32 is a voltage comparator whose output is triggered to a logical high level when the input video signal is above an adjustable threshold level. The threshold level is adjusted so that a logical high is output only for the higher voltage levels in the video signal that correspond to the bright spots of the light sources, and a logical low is output for the voltage levels that are produced by the background of the scene.

To know where detected bright pixels appear in an image, one needs to count the time between the start of a video field and the starts of the lines, and the times between the start of a line and the trigger of Spot Level Detector 32 to high. The time for the start of the field and the time for the start of a new video line are obtained by finding when Sync Detector 34 detects a sync pulse and becomes high. Sync Detector 34 is a comparator which outputs a logical high level when the signal voltage falls under 0.2 volts. As mentioned earlier, a field sync pulse is more than 5 times longer than a line pulse, therefore these sync pulses are easily distinguishable using timing loops and counters. Examples of detailed design and electronic components for similar devices can be found in the paper by Ciarcia cited above, and in the series of 3 papers by Ed Nisley, titled "Image Wise/PC—The Digitizing Continues", in Circuit Cellar Ink, November–December 88, January–February 89, February–March 89 Pixel String Detector 28 combines the information provided by Sync Detector 34 and Spot Level Detector 32 with timing information given by a clock and counters to output the locations of the beginning and end pixels of strings of bright pixels.

Figure 2:
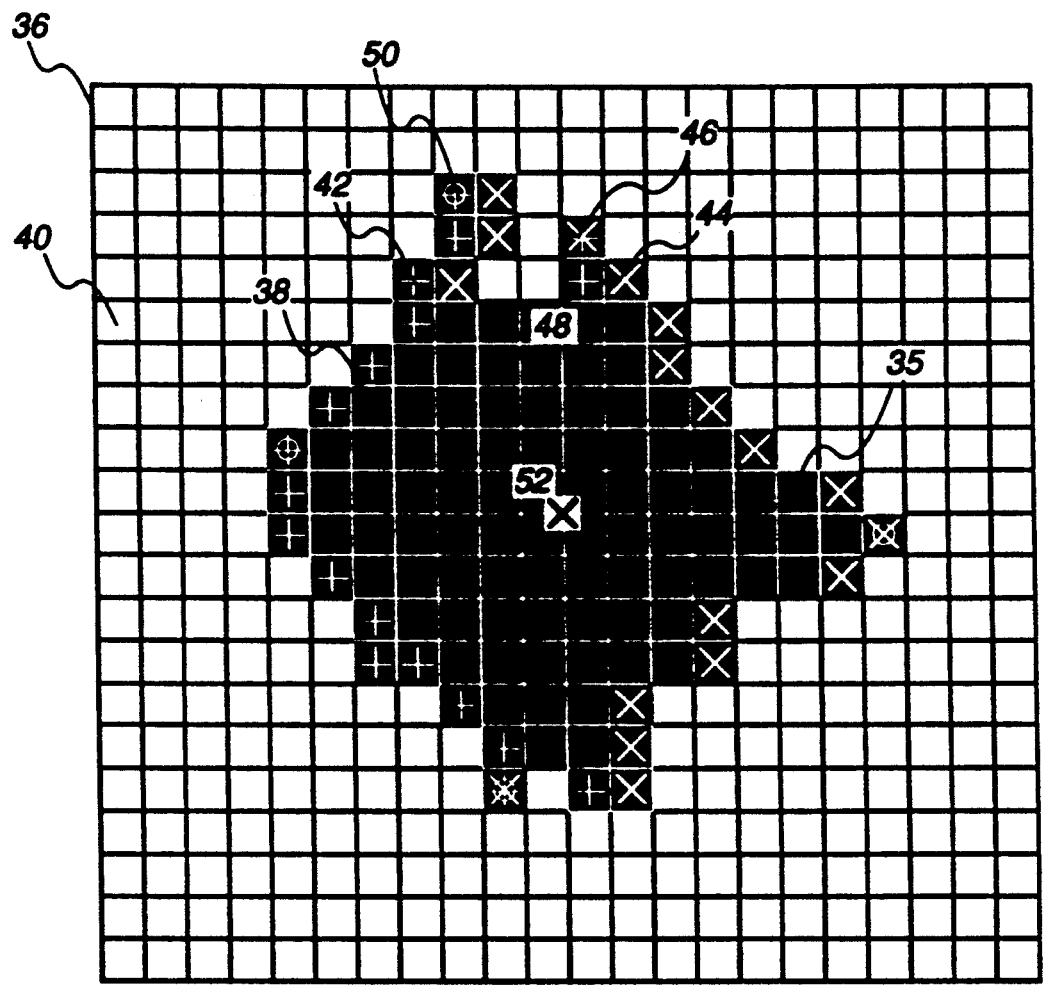
FIG. 2 shows an enlarged image of a spot of contiguous bright pixels.

In FIG. 2, the enlarged image of a digitized bright spot 35 is shown. Grid lines 36 have the purpose of showing the borders of these pixels. Bright pixels 38 are represented as black squares, and background pixels 40 as white squares. The bright spot is composed of several lines of bright pixels, and the strings of bright pixels from one line contain pixels that are contiguous to some of the pixels of the string of a neighbor line. Pixels 42 at the beginning of a string are indicated by a straight cross in FIG. 2, and pixels 44 at the end of a string are indicated by a diagonal cross. Some pixels, such as 46, are alone in their string, and being both at the beginning and the end of their strings get marked by a diagonal cross and a straight cross. For each detected string the Pixel String Detector 28 outputs the line number $Y_s$ of occurrence of the string, followed by the column number $X_b$ of the beginning pixel of the string and the column number $X_e$ of the end pixel of the string.

Figure 3:
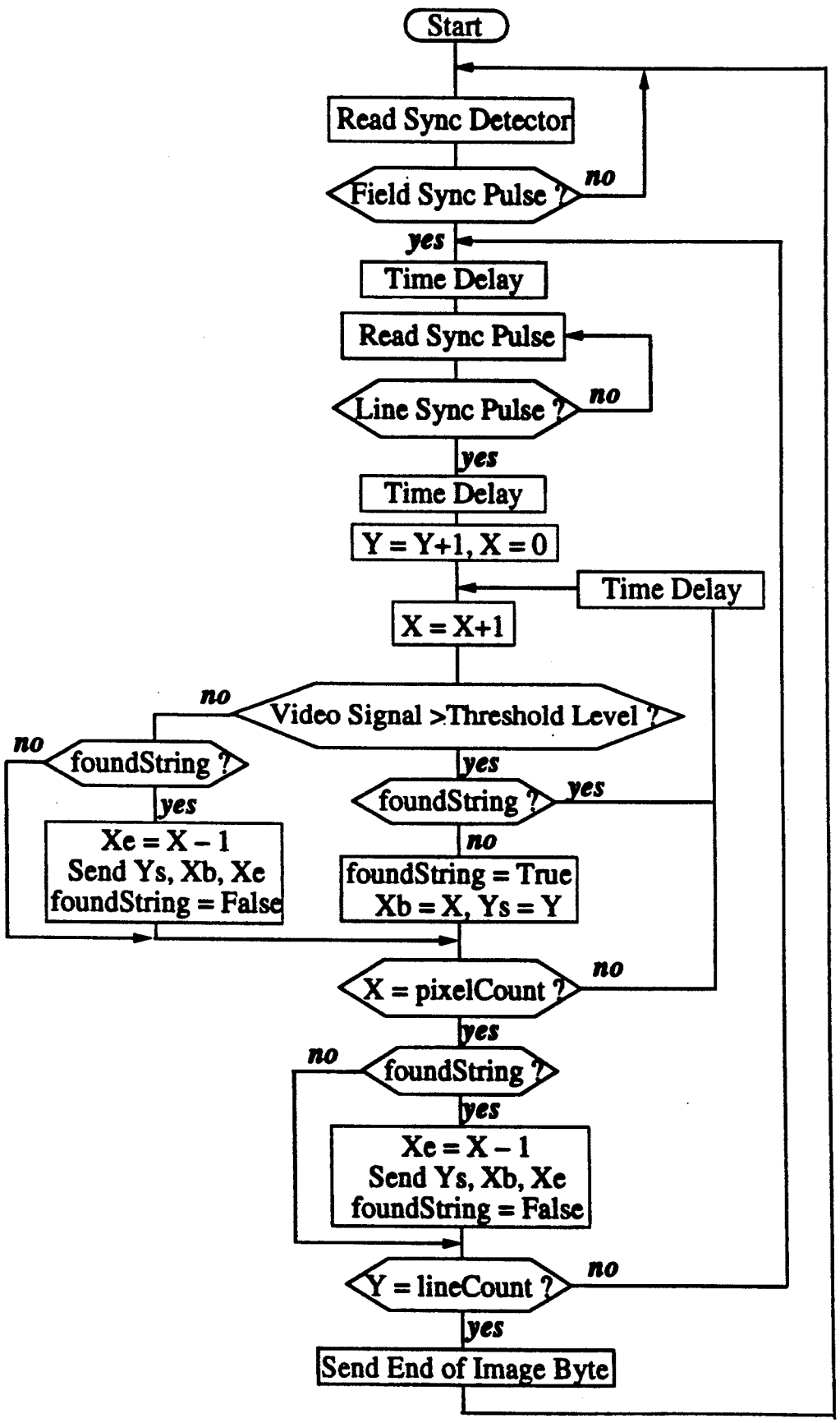
FIG. 3 is a flowchart of the operations which monitor the video signal of the camera to obtain the position of the beginning pixel and ending pixel in each string of contiguous bright pixels obtained from the signal.

The flowchart for the steps required for this task is shown in FIG. 3 and uses these notations. Also, Y is the value of the counter for the number of lines, and X is the counter for the number of columns. The variable pixelCount is the total number of columns, i.e. the total number of pixels in a line. If Pixel String Detector 28 checks Spot Level Detector 32 every 200 nanoseconds to see whether its output is high (signifying that the video signal voltage is higher than the threshold level), there is time for checking 256 pixels for each line of video data, an amount which produces a reasonable level of precision in the detection of the spots. The variable foundString in the flowchart is a boolean variable which becomes true as soon as a bright pixel is found, and becomes false again as soon as a background pixel is found. Following the flowchart, Pixel String Detector 28 checks Sync Detector 34 until a field sync pulse is detected. Once this happens Sync Detector 34 is checked again until a line sync pulse is detected. As mentioned earlier, differentiating between field and line sync pulses requires evaluating their lengths, an implementation detail not shown in the flowchart. Once the beginning of a line is found, the line counter Y is incremented and the Spot Level Detector 32 is checked at regular time intervals (for example every 200 nanoseconds) and the pixel counter is incremented each time. The first time it is found high, this means that a string of bright pixels is found, and the variable the value X of the pixel counter is stored in the variable $X_b$. These are the coordinates of the beginning pixel of the string. Then if Spot Level Detector 32 turns back to low or if the end of the line reached (pixelCount=256 for the pixel time taken as example), the variable foundString is set to false again and the value X of the pixel counter is stored in the variable $X_e$, the column number of the end pixel. Then the variables $Y_s$, $X_b$, $X_e$ are sent to Spot Center Detector 32, and the system checks for a new line sync pulse, unless all the lines of a field have been read, in which case the system checks for a new field pulse.

In FIG. 4, the basic steps used by Spot Center Detector 30 for finding the centers of spots from the strings of bright pixels defined by variables $Y_s$, $X_b$, $X_e$ are presented in a flowchart. A spot is an area of contiguous bright pixels, thus it is composed of a single pixel string or a group of strings with contiguous piexels from several image lines. The center of the spot is defined here as a point with a veritcal image coordinate equal to the average between the highest and lowest lines of the spot, and a horizontal coordinate equal to the average between the leftmost and rightmost column of the spot. Reading a new pixel string, the code takes one string of the previous line at a time (if any), and looks if its column overlap with the columns of the new string. If it does, the two strings belong to the same spot. The two strings then share information about the left, right, upper and lower bounds of the groups of pixels to which they each belonged to come out with the left, right, upper and lower bounds of the group of pixels to which they both belong. This mechanism successfully groups several distinct pixel strings of one line with a single overlapping string of the next line, a situation which occurs in top lines 4987 of spot 35 in FIG. 2. When a pixel string of one line is not contiguous to any string of the next line, or is at the bottom of the image, no more grouping can be found for this string, and the center and size for the corresponding group of pixels is output from the Spot Center Detector. Returning to FIG. 2, pixels 50 that produced extermal values for lines or columns are marked with a circle, and found center 52 of the spot 35 is indicated by a white square and a diagonal cross. Note that if the center is taken half way between the extrema without rounding to an integer number, its position can fall between pixels, as happens for center 52. In the rest of the specification, these spot centers are referred to as image points, and are considered to be the images of the points located at the centers of the light sources of the object.

From the found positions of these spots, Object Pose Module 29 of FIG. 1 uses a precomputed matrix 31 which depends only on the relative positions of LEDs 24 on the object to compute the set of parameters that express the position and rotation of the object in the camera coordinate system. These are the 3 coordinates of the translation vector and the 9 elements of rotation matrix 33 in the preferred embodiment as shown on FIG. 1. Details of operations of Object Pose Module 29 are given below.

The drawings of FIGS. 5 are used to explain the theoretical bases on which the task applied by Object Pose Module 29 is based. In the following explanations of these theoretical bases, bold characters are used for denoting vectors and matrices.

The notations for the object are shown on FIG. 5A. Points 60 of the object that are visible and easily detected in the camera image are called $M_0$, $M_1$, $M_2$, $M_3$, etc. Four points are shown for illustration purposes, but the method applies with at least four noncoplanar points and as many noncoplanar points as is wished. Placing LEDs at these locations is one way to make these points visible and easily detectable in the camera image. Placing patches of retroreflective material able to reflect light coming from a single light source is another way to achieve the same result. The coordinates of these points in the object are assumed to be known, and can be defined by their coordinates in a cartesian coordinate system 62 fixed to the object. Origin 64 of coordinate system 62 is taken to be one of the points, say $M_0$. This point will be called the reference point of the object. Note that the method only requires that the image of the reference point be easily found in the camera image of the object. Therefore the reference center does not have to be visible itself, but can be chosen to be a linear combination of the visible points, such as the center of gravity of the visible points. Then, using a well known approximate property of perspective projection, the image of the reference center can be taken to be the same linear combination of the images of the visible points, such as the center of gravity of the images of the visible points. However in the preferred embodiment, one of the visible points such as M0 has been chosen as a reference point. Axes 66 are called $M_0X_0$, $M_0Y_0$ and $M_0Z_0$. Unit vectors 68 of this coordinate system are called $i_0$, $j_0$, and $k_0$. The coordinates of $M_0$ in object coordinate 62 system are (0, 0, 0). The vector $M_0M_1$ has coordinates $X_1$, $Y_1$ and $Z_1$, written $(X_1, Y_1, Z_1)$. Similarly, $M_0M_2$ has coordinates $(X_2, Y_2, Z_2)$, and so on.

To simplify the figures, the axes $M_0X_0$ and $M_0Z_0$ are represented parallel to the plane of the figure. However the explanations below apply to the most genera; configurations.

The notations for the geometric construction used for modelling the image formation process in the camera are shown in FIG. 5B. This image formation process is modelled using the pinhole camera model, a reasonable assumption widely used in the field of computer vision. For details, see for example the book "Computer Vision", by Ballard and Brown, Prentice-Hall. With this model, the imaging process is simply a central projection in which the center of projection is the pinhole of the camera, and the projection plane is the image plane of the camera. This central projection is also called perspective projection. In the figures center of projection 70 is labelled O, and image plane 72 is labelled J. For simplicity image plane 72 is drawn on the same side of the center of projection O (72) as points 60 of object 20, whereas in an actual pinhole camera the image plane is on the other side of the center of projection, with the result that the image is inverted. Here the image consists of the central projection of points 60 of object on image plane J. For example image m1 in image plane J of a point $M_1$ in front of the camera is constructed by taking the intersection of a ray from point $M_1$ to center of projection O with image plane J, as shown in FIG. 5B. Coordinate system 74 of camera 26 is shown to be centered in O, and has axes Ox and Oy parallel to the image plane J and axis Oz perpendicular to the image plane J. To simplify the figures, axes Ox and Oz are shown to be parallel to the plane of the figures. Optical axis 76 of camera 26 is axis Oz. Focal length f of camera 26 is the z-coordinate of image plane J. Unit vectors 78 of camera coordinate system 74 are i for the axis Ox and k for Oz. Unit vector j of axis Oy is perpendicular to the plane of the paper and could not be shown. The position of image point $m_0$ in image plane J is defined by its coordinates $x_0$ and $y_0$, the position of image point $m_1$ by coordinates $x_1$ and $y_1$, etc.

Solving problems using the prespective projection construction of the pinhole camera often leads to complicated equations. A well-known approximate construction, called scaled orthographic projection, has been used extensively in the literature of computer vision, and gives a very close approximation to the exact results when the size of the object is small compared to the distance of the object to the center of projection. This construction is illustrated in FIG. 5C and proceeds in two steps:

(1) In a first step, a plane K (80) parallel to image plane J is taken through one of the points of the object, say $M_0$, and the points of the object are projected onto this plane by perpendicular projection. This projection is called an orthographic projection. The projections of $M_0$, $M_1$, $M_2$, $M_3$ are $P_0$, $P_1$, $P_2$, $P_3$ in FIG. 5C. ($M_0$ and $P_0$ are superposed since $M_0$ belongs to the plane of projection). The distance from plane K to center of projection O is called D.

(2) In a second step, points $P_0$, $P_1$, $P_2$, $P_3$ are projected onto image plane J by an exact perspective projection, and give projections $m_0$, $m_1$, $m_2$, $m_3$ that are close to the projections that would be obtained by directly projecting $M_0$, $M_1$, $M_2$, $M_3$ onto image plane J.

Reversely, if image points $m_0$, $m_1$, $m_2$, $m_3$ are given and the rotation and translation of the object is computed assuming a scaled orthographic construction instead of the exact perspective construction, these will not be the exact rotation and translation, but will be at a level of precision sufficient for most purposes. Using the scaled orthographic projection results in equations which can be solved by linear algebra according to this invention, resulting in very short computation times and the ability to track the object motion in real time even with inexpensive computing technology.

The information which is available for finding the unknown object pose is the following: As previously explained the coordinates of object points $M_1$, $M_2$, etc., in the coordinate system of the object are known by preliminary measurements. The coordinates $(x_1, y_1)$, $(x_2, y_2)$, etc. of image points $m_1$, $m_2$, etc., are given by the analysis of the video signal described earlier. Furthermore an image point such as $m_1$ is known to be the image of object point $M_1$ and no other point, similarly for $m_2$ and $M_2$, etc.

From this information the pose of the object with respect to the camera must be found, namely the translation vector and rotation matrix of the coordinate system of the object in the camera coordinate system. The translation vector of the object is the vector $OM_0$ for which the coordinates in the camera coordinate system must be found. As is well known, the row vectors of the rotation matrix are simply the unit vectors $\mathbf{i}$, $\mathbf{j}$, $\mathbf{k}$, of the camera coordinate system expressed in the coordinate system of the object. Therefore the following paragraphs explain how to solve for these yet unknown vectors from the known image and object information just reviewed.

In the construction of FIG. 5C, the x and y coordinates of vector $P_0P_1$ in camera coordinate system 74 are the same as the x and y coordinates of the vector $M_0M_1$. By definition of coordinates, these coordinates are the projections of vector $M_0M_1$ on unit vectors $\mathbf{i}$ and $\mathbf{j}$ of the camera. The z-coordinate of $P_0P_1$ is 0, since this vector belongs to a plane that is perpendicular to the z-axis of camera coordinate system 74. Therefore the coordinates of $P_0P_1$ are $(M_0M_1 \cdot \mathbf{i}, M_0M_1 \cdot \mathbf{j}, 0)$, where the dot notation expresses a dot product operation between vectors. Note that this is true provided the coordinates for vectors $M_0M_1$, $\mathbf{i}$ and $\mathbf{j}$ are for the same coordinate system. In a particular, if the known coordinates for $M_0M_1$ in object coordinate system 62 are used, the coordinates for vectors $\mathbf{i}$ and $\mathbf{j}$ must be for object coordinate system 62. These coordinates of the two vectors are in this case the elements of the first two rows of the rotation matrix, as already mentioned.

In the scaled orthographic projection, the plane of perpendicular projection K and the image plane are parallel, therefore an image vector such as $m_0m_1$ is a scaled down version of $P_0P_1$ with a positive scale factor denoted s. The value of this scale factor is the ratio of the distances of the two planes to the center of projection O, therefore $$s = f/D$$

Since $m_0m_1$ and $P_0P_1$ are proportional, their coordinates are proportional:

$$x_1 - x_0 = sM_0M_1 \cdot \mathbf{i},$$

$$y_1 - y_0 = sM_0M_1 \cdot \mathbf{j}$$

and similar equalities can be written between the other image points and their corresponding object points.

Vectors $\mathbf{V}_x$ and $\mathbf{V}_y$ are now defined as scaled down versions of unit vectors $\mathbf{i}$ and $\mathbf{j}$:

$$\mathbf{V}_x = s\mathbf{i},$$

$$\mathbf{V}_y = s\mathbf{j}$$

Note that once $\mathbf{V}_x$ and $\mathbf{V}_y$ have been found, s is easily obtained as the length of either vector, and $\mathbf{i}$ and $\mathbf{j}$ are deduced by dividing these vectors by s.

The above equalities write $$x_1 - x_0 = M_0M_1 \cdot \mathbf{V}_x,$$

$$y_1 - y_0 = M_0M_1 \cdot \mathbf{V}_y$$

and similarly:

$$x_2 - x_0 = M_0M_2 \cdot \mathbf{V}_x,$$

$$y_2 - y_0 = M_0M_2 \cdot \mathbf{V}_y$$

and so on for all points.

These expressions can be regrouped into the following two matrix equations:

$$\mathbf{I}_x = \mathbf{A}\,\mathbf{V}_x,$$

$$\mathbf{I}_y = \mathbf{A}\,\mathbf{V}_y$$

where $\mathbf{I}_x$ is the vector with coordinates $(x_1 - x_0, x_2 - x_0, x_3 - x_0, \ldots)$ and the vector $\mathbf{I}_y$ is the vector with coordinates $(y_1 - y_0, y_2 - y_0, y_3 - y_0, \ldots)$. Vectors $\mathbf{I}_x$ and $\mathbf{I}_y$ are called the image x-vector and the image y-vector in this disclosure. Matrix A is a matrix in which the first row has 3 elements that are the 3 coordinates of object point $M_1$, the second row has 3 elements that are the 3 coordinates of object point $M_2$, and so on for the other rows.

To solve these two equations for $\mathbf{V}_x$ and $\mathbf{V}_y$, the well known pseudo-inversion operation is applied to matrix A (see for example the Appendix section in the book "Robot Vision" by B. K. P. Horn, MIT Press, for details on pseudo-inverse operations for matrices). The result of the pseudo-inversion is a matrix which is called object matrix B in this disclosure because it depends only on the relative position of the object points. For only 4 noncoplanar object points, matrix A is an invertible 3×3 matrix, and the pseudo-inversion gives the same result as a regular matrix inversion. The solutions for the vector $\mathbf{V}_x$ and $\mathbf{V}_y$ in the least square sense are $$\mathbf{V}_x = \mathbf{B}\,\mathbf{I}_x,$$

$$V_y = B\ I_y$$

A requirement for this operation to produce meaningful results is that the arrangement of object points used to generate matrix A must not be noncoplanar and must not have a plane of symmetry be noncoplanar.

Then i and j are simply obtained by normalizing $V_x$ and $V_y$, since i and j are unit vectors. As mentioned earlier, the 3 elements of the first row of the rotation matrix of the object are then the 3 coordinates of vector i obtained in this fashion. The 3 elements of the second row of the rotation matrix are the 3 coordinates of vector j. The elements of the third row are the coordinates of vector k of the z-axis of camera coordinate system 74 and are therefore obtained by taking the cross-product of vectors i and j.

Now the translation vector of the object can be obtained. It is vector $OM_0$ between center of projection O and $M_0$ origin of object coordinate system 62. Since $m_0$, image point of $M_0$, belongs to image plane J at a distance f from center of projection O, and MO belongs to plane K parallel to J at a distance D from O (FIG. 5C), translation vector $OM_0$ is aligned with vector $Om_0$ and is equal to $D.f\ OM_0$ i.e. $1/s\ OM_0$. Scale factor s is obtained by taking the norm of vector $V_x$ or vector $V_y$.

As previously mentioned, the first coordinate of the image x-vector must use x-coordinate of the image of the object point used in the first row of the matrix A that yields the object matrix B after pseudo-inversion, and so on, and similarly for the image y-vector. Only with this order will the scale factor obtained as the norm of the vector $V_x$ and the scale factor obtained as the norm of the vector $V_y$ be equal (within processing errors), and only with this order will the vectors i and j be perpendicular. In other words with this order, vectors $V_x$ and $V_y$ defined above are perpendicular and of equal lengths. In the preferred embodiment a positive correspondence measure C which becomes small when both of these conditions are met is defined. The preferred way to build such a quantity is $$C = |V_x \cdot V_y| + |V_x \cdot V_x - V_y \cdot V_y|$$

where enclosing vertical bars symbolize the absolute value operation. When the proper correspondence has been used between image points and object points in order to obtain an object matrix and image vectors in corresponding orders, this correspondence measure C is found to be close to zero. Finding a large correspondence measure characterizes the fact that the wrong correspondence has been taken between image points and object points. Therefore in one embodiment of the system, the object pose computation is applied to each of several candidate correspondence assignments, and the calculated pose of the object that is accepted as the object pose is the one for which the correspondence measure is small.

Referring now to FIG. 6, a simple embodiment for the correspondence assignment task is presented in which the correspondence combinations are small and can be all examined. If 4 LEDs 24 are used and 4 image spots 35 are detected, there are 24 possible assignments between the image spots and the object LEDs, so that computing 24 poses and keeping the pose that produces the smallest correspondence measure C as proposed may be too time consuming in inexpensive computers. The combinations can be reduced if two categories of LEDs are used and these categories are easily discriminated in the image. For example in one embodiment large and small LEDs are used, producing large and small image spots with easily differentiable spot sizes. For the case of two large and two small LEDs, the 4 possible assignments are shown in the box in FIG. 6. These assignments are then discriminated by comparing the correspondence measures C for the computed poses (defined above).

FIG. 7 shows a correspondence assignment embodiment which is based on using several alignments 61 of object points 60, and ratios of distances between points within each alignment. Aligned object points 61 produce aligned image points 63. Also it is well known that the same harmonic distance ratios are found between 4 aligned object points and the corresponding image points. Two alignments of 4 object points can be constructed with very distinct harmonic ratios, so that each image alignment can be easily assigned to its corresponding object alignment. Alignments of 3 points can also be considered, but the ratios of distances between 3 points are only approximately preserved in perspective projection. Yet when there are only two alignments in the object, it is possible to choose two very different ratios so that the discrimination is still possible in the image.

Things are complicated by the fact that alignments which do not correspond to any object alignment may be fortuitously created in the image. For example an object point of one alignment may project into the image alignment of another alignment. For example, point C in FIG. 7 projects into image point c on on image plane 72. Image point c is common to the two image alignments. The tables which appear next to the drawing in FIG. 7 show the image alignments of 3 points found in the image, the ratios found for each, the possible matches of these triples with the object alignments, and the best correspondence. Also note, the second best correspondence can be easily rejected on the basis that the image point b would be matched both to point C and to point D, indicating that two object points project to the same image points. This is unlikely since as many image points as object points were found.

FIG. 8 shows in a flowchart the sequence of steps necessary to find alignments of 3 points in the image, order the points in the alignments, compute the distance ratios, match the image alignments to the object alignments on the base of these ratios, and select the best correspondence assignment. A similar sequence is required if alignments of 4 points and harmonic ratios are used instead.

Once several images have been processed and several successive object poses have been obtained, the system applies a tracking technique illustrated in FIG. 9, which avoids rechecking the correspondence assignments between object points and image points. From these previous object poses, the system approximately predicts what the pose will be once a new image is processed, by extrapolating the previous poses. From this predicted pose, the object points 60 are projected onto image plane 72 to obtain predicted image spot locations 82. From the estimations of the prediction uncertainties, uncertainty squares 84 are defined around each predicted point and chosen large enough to contain the actual spot centers with high confidence. Considering the list of uncertainty squares against the list of image points (found by the part of the system described in reference to FIG. 1), the object point used in computing the uncertainty square is matched with the image spot which falls into it. Thus if no uncertainty squares overlap, no further correspondence assignment procedure is needed. However if two or more uncertainty squares happen to overlap as shown in FIG. 9 in 86, the correspondence becomes ambiguous between the image spots found in the overlapping squares and the object points used in predicting these square locations. To avoid solving this labelling issue, the system simply uses the well labeled predicted image points in place of the possibly mislabelled actual image points. The information relative to the actual positions of those image points that are not used is lost for this image, but in the next digitized image the uncertainty squares for these points will probably not overlap anymore while other uncertainty squares may, so that these random losses of information for different image points tend to average out.

Other cases when a predicted image point is automatically used instead of the actual image point occur when an uncertainty square found by the prediction falls entirely or partially out of the image, or when an uncertainty square does not contain an image point, possibly because the corresponding object point is obstructed. Thus after the initial images the system does not require all the object points to be visible.

The computed pose will deteriorate if more and more image points exit the boundaries of the image or get obstructed, up to the moment when the computed pose is not good enough for successfully tracking the image points that remain visible. At that moment, the system has to wait until all the image points are visible again in the image to be able to compute the object pose. When this occurs, the system applies the correspondence assignment techniques described earlier for several images, then starts a new tracking sequence.

In FIG. 10, a flowchart is shown which includes the computation steps for the initial images in which correspondence techniques are applied, and the succeeding images in which tracking techniques are applied which keep track of each spot separately and make other correspondence techniques unnecessary. A box in this flowchart indicates where the cursor would be redrawn in a cursor control implementation such as illustrated in FIG. 11, and obviously this step would be replaced by different actions in other applications, such as refreshing the graphics displayed to the operator in virtual reality applications using for example the device of FIG. 12, or sending control commands to a teleoperated system. The operations required at each step of FIG. 10 have already been detailed in the explanations of the previous Figures.

Referring to FIG. 11, an embodiment of the pose monitoring system for cursor control on a computer display is illustrated. Camera 26 is positioned next to computer display 88 and faces the operator. Object 20 is composed of a frame 22 supporting several LEDs 24. Frame 22 is preferably composed of thin or transparent structure in order to minimize the chances that the frame be on the way of the view of a LED by the camera. A handle 92 is attached to object 20, and is held in hand 90 of the operator. Batteries that power the LEDs are contained in handle 92. LEDs 24 may emit light in the infrared range instead of the visible light range and the sensing array for camera 26 may be chosen to be more sensitive to infrared light than to visible light so that the response of the camera array to the LEDs is large in comparison to the response to background light and so that the spots created by the LEDs in the image are much brighter than the background even when the operator works in ambient light. The device processing the camera signal and computing the object pose according to this invention is not shown and is implemented on a printed circuit board which may be enclosed in the camera housing, in an independent housing, or inside the main computer. The positions and orientations in space of object 20 are computed at successive time intervals as described above. A screen cursor 94 is shown on the computer display among perspective views of 3D objects, a cuboid peg 96 and a block 97. Screen cursor 94 is the perspective projection of a virtual 3D cursor of known 3D structure that is rigidly linked to object 20, so that the computed object position and orientation are taken to be the position and orientation for the virtual 3D cursor at every instant. In the illustration of FIG. 11, the 3D cursor is a stick figure of a man with a spherical head holding in his right hand an arrow that is perpendicular to the plane of his object and points in front of him. Screen cursor 94 is obtained from the virtual 3D cursor by the same perspective projection that is used for the other 3D objects of the virtual 3D scene represented on the computer display. In the drawing, the operator has attached the 3D cursor to cuboid peg 96, and is inserting peg 96 into the rectangular hole of block 97.

With this device, the operator can also remotely and interactively control the motions of a teleoperated mechanism, provided servomechanisms translate the 3D motions of the 3D cursor computed by the system into mirrored mechanical displacements of the teleoperated mechanism.

In FIG. 12, another embodiment of the pose monitoring system is illustrated, in which the position and orientation in space of the head of an operator is monitored. Applications include aircraft flight simulators and other virtual reality applications. From the translation vector and rotation matrix computed by the system for the head of the operator, the correct field of view and perspective projection of the virtual scene are computed and projected in front of the eyes of the operator. Two noncoplanar alignments 61 of LEDs 24 are mounted on the top surface of a helmet 98. Camera 26 mounted above operator's helmet 98 captures the images of LEDs 24. With judicious camera placement, the LEDs may be mounted on an opaque support as is shown in the drawing without risk of the support obstructing the view of the LEDs, because the ranges of the operator's head motions in tilt and roll are anatomically limited.

Many other domains of technology can benefit from the fast and inexpensive remote detection of the motions of objects or humans by the computer vision techniques allowed by this invention. Therefore, although the description above contains many specificities, these should not be construed as limiting the scope of this invention but as merely providing illustrations of some of the presently preferred embodiments of this invention. For example, the light sources on the object could be light-emitting bars, the camera could use an array of light sensitive random access memory elements, the processing tasks could be implemented in Programmable Array Logic chips, etc.

Thus the scope of this invention should be determined by the appended claims and their legal equivalents, rather than by the examples given.

I claim:

1. In an apparatus for monitoring the position and orientation of a rigid three-dimensional (3-D) object in space comprising:

a single electronic camera having an image plane, a center of projection, an optical axis, and a camera reference coordinate frame being centered at the center of projection with x and y axes parallel to the image plane and a z-axis parallel to the optical axis, the single electronic camera producing an analog video signal;

a plurality of at least four light sources rigidly attached to the rigid 3-D object in a noncoplanar arrangement, these light sources projecting bright spots onto the image plane of the camera;

processing means for processing the analog video signal and determining a list of bright spot x-coordinates and y-coordinates in the camera reference coordinate frame;

computing means including memory means, output means and display means;

the computing means including pose computing means for approximately computing a translation vector and a rotation matrix of the rigid 3-D object in the camera reference coordinate frame;

the output means modifying images on the display means; the improvement comprising:

the arrangement of light sources being any noncoplanar arrangement so long as the light sources are not all located along three orthogonal lines.

2. The improvement of the apparatus of claim 1, further comprising coupling means between the rigid 3-D object and a body part of an operator, whereby motions of the body part of the operator are transmitted to the rigid 3-D object and are monitored by the single electronic camera.

3. The improvement of the apparatus of claim 2, wherein the coupling means is a means for hand operation.

4. The improvement of the apparatus of claim 2, wherein the coupling means is a means for head operation.

5. The improvement of the apparatus of claim 2, further comprising structure coordinate lists stored in the memory means for describing a geometry of 3-D structures;

the computing means further including perspective projection means repeatedly combining the translation vector and the rotation matrix with the structure coordinate lists to output a perspective image of the 3-D structures onto the display means.

6. The improvement of the apparatus of claim 5, wherein:

one of the 3-D structures is a 3-D cursor, whereby a perspective image of the 3-D cursor is displayed on the display means and interactively emulates translations and rotations of the body part of the operator.

7. The improvement of the apparatus of claim 5, wherein:

one of the 3-D structures is a 3-D scene, whereby a perspective image of the 3-D scene is displayed on the display means in front of the eyes of the operator from a point of view which can be interactively modified by the motions of the body part of the operator.

8. The improvement of the apparatus of claim 1, wherein the light sources are light emitting diodes.

9. The improvement of the apparatus of claim 1, wherein the light sources are secondary light sources composed of small flat reflective elements which reflect light from a single primary light source.

10. The improvement of the apparatus of claims 1, wherein:

the light sources differ in sizes;

the computing means further includes means for measuring the sizes of the bright spots;

the computing means further includes means for matching large light sources to large bright spots and small light sources to small bright spots.

11. The improvement of the apparatus of claim 1, wherein:

the light sources are positioned along lines and form known distance ratios with respect to each other;

the computing means further includes means for detecting alignments among the bright spots, means for measuring distance ratios between the bright spots along these alignments; and means for matching the light sources to the bright spots according to their distance ratios.

12. The improvement of the apparatus of claim 1, wherein:

an object reference coordinate frame for the rigid 3-D object is centered at one reference light source, this reference light source projecting onto the image plane at a reference bright spot m having an x-coordinate and a y-coordinate in the camera reference coordinate frame, the locations of light sources other than the reference light source in the rigid 3-D object being defined by secondary light source coordinates in the object reference coordinate frame;

the memory means stores a precomputed pseudo-inverse matrix obtained by pseudo-inversion of a matrix in which three elements of each row are the secondary light source coordinates;

the computing means further includes means for:

computing a vector of x-values and a vector of y-values by subtracting the x-coordinate and y-coordinate of the reference bright spot m from the list of bright spot x-coordinates and y-coordinates respectively in the camera reference coordinate frame;

multiplying the pseudo-inverse matrix by the vector of x-values to provide a vector $V_x$ and multiplying the precomputed pseudo-inverse matrix by the vector of y-values to provide a vector $V_y$, constructing the rotation matrix of the rigid 3-D object in the single electronic camera frame of reference by taking as first row the vector $V_x$ after normalization, as second row the vector $V_y$ after normalization, and as third row the cross product of the vectors of the first two rows, finding the translation vector of the rigid 3-D object as the division of vector Om from the center of projection O of the single electronic camera to the reference bright spot m by the average of the approximately equal lengths of the vector $V_x$ and the vector $V_y$.

13. The improvement of the apparatus of claim 12, wherein the pose computing means further includes prediction means for finding predicted bright spot locations on the image plane by extrapolations of data obtained at previous instants and uses the predicted bright spot locations in replacement to actual bright spot locations every time the actual bright spot locations fail to be detected from the analog video signal of the single electronic camera.

14. An apparatus for three-dimensional (3-D) cursor control by an operator comprising:

a single electronic camera having an image plane, a center of projection, an optical axis, and a camera reference coordinate frame being centered at the center of projection with x and y axes parallel to the image plane and a z-axis parallel to the optical axis, the single electronic camera producing an analog video signal;

a plurality of at least four light sources configured in any noncoplanar arrangement so long as the light sources are not all located along three orthogonal lines, the light sources having a light source reference coordinate frame and light source coordinates in this object reference coordinate frame, these light sources projecting bright spots onto the image plane of the camera;

means for processing the analog video signal and determining a list of bright spot locations in the camera reference coordinate frame;

handle means for allowing an operator to hold and move the plurality of light sources freely in space;

computing means for:

repeatedly combining the bright spot locations with the light source coordinates;

repeatedly producing a rotation matrix and a translation vector in the camera reference coordinate frame;

repeatedly outputting onto display means in front of the operator's eyes a perspective image of a 3-D virtual cursor located in space at a position and orientation defined by the rotation matrix and the translation vector.

15. A sensing system for producing at successive time instants digital signals expressing positions and orientations of a rigid three-dimensional (3-D) object in space comprising:

a single electronic camera having an image plane, a center of projection, an optical axis, and a camera reference coordinate frame being centered at the center of projection with x and y axes parallel to the image plane and a z-axis parallel to the optical axis, the single electronic camera producing an analog video signal;

at least four noncoplanar light sources rigidly attached to the rigid 3D object in any noncoplanar arrangement so long as the light sources are not all located along three orthogonal lines, the light sources having light source coordinates in an object reference coordinate frame of the rigid 3D object, the light sources projecting bright spots onto the image plane of the camera;

means for processing the analog video signal and determining a list of bright spot locations in the camera reference coordinate frame;

computing means which include memory means and output means;

the memory means storing a precomputed pseudo-inverse matrix depending only on the light source coordinates in the object reference coordinate frame;

the computing means including pose computing means for:

computing a translation vector and a rotation matrix of the rigid 3-D object in the camera reference coordinate frame, combining the precomputed pseudo-inverse matrix with the list of bright spot locations, by matrix multiplications, vector normalizations and vector cross-products, and providing to the output means for each frame of the video signal the three coordinates of the translation vector of the rigid 3-D object and the nine elements of the rotation matrix of the rigid 3-D object in digital form.

* * * * *